United States Patent [19]
Dias et al.

[11] 4,347,671
[45] Sep. 7, 1982

[54] VACUUM-DRYING METHOD AND APPARATUS

[75] Inventors: Francisco J. Dias; Willi Hannen, both of Jülich; Hartmut Luhleich, Düren; Peter Pflaum, Jülich, all of Fed. Rep. of Germany

[73] Assignee: Kernforschungsanlage Jüich, Gesellschaft mit beschränkter Haftung, Jüich, Fed. Rep. of Germany

[21] Appl. No.: 136,927

[22] Filed: Apr. 3, 1980

[30] Foreign Application Priority Data

Apr. 7, 1979 [DE] Fed. Rep. of Germany ....... 2914181

[51] Int. Cl.³ .............................................. F26B 5/04
[52] U.S. Cl. ....................................... 34/15; 34/27; 34/73; 34/92
[58] Field of Search ................... 34/92, 73, 178, 5, 15, 34/27

[56] References Cited

U.S. PATENT DOCUMENTS

| | | | |
|---|---|---|---|
| 1,801,687 | 4/1931 | Pelphrey | 261/116 |
| 2,512,897 | 6/1950 | David | 34/76 |
| 3,742,614 | 7/1973 | Bettermann et al. | 34/92 |
| 4,081,914 | 4/1978 | Rautenbach | 34/92 |

FOREIGN PATENT DOCUMENTS

463080 3/1937 United Kingdom .
932576 7/1963 United Kingdom .

Primary Examiner—Larry I. Schwartz
Attorney, Agent, or Firm—Karl F. Ross

[57] ABSTRACT

A method of and an apparatus for the drying of articles, especially foodstuffs, biological materials and other substances susceptible to cell damage with overheating, wherein the material is spread in a high-vacuum vessel directly adjacent a cooled condenser and is subjected to a vacuum by a pump capable of developing pressures as low as about 0.1 mbar. The chamber is evacuated until there is a noticeable formation of the condenser whereupon the connection between the pump and the chamber is closed and the product is heated to evaporate liquids but below a predetermined temperature (say a maximum of 50° C.) while the condensate resulting from the evaporation is collected directly below the product and is discharged.

6 Claims, 1 Drawing Figure

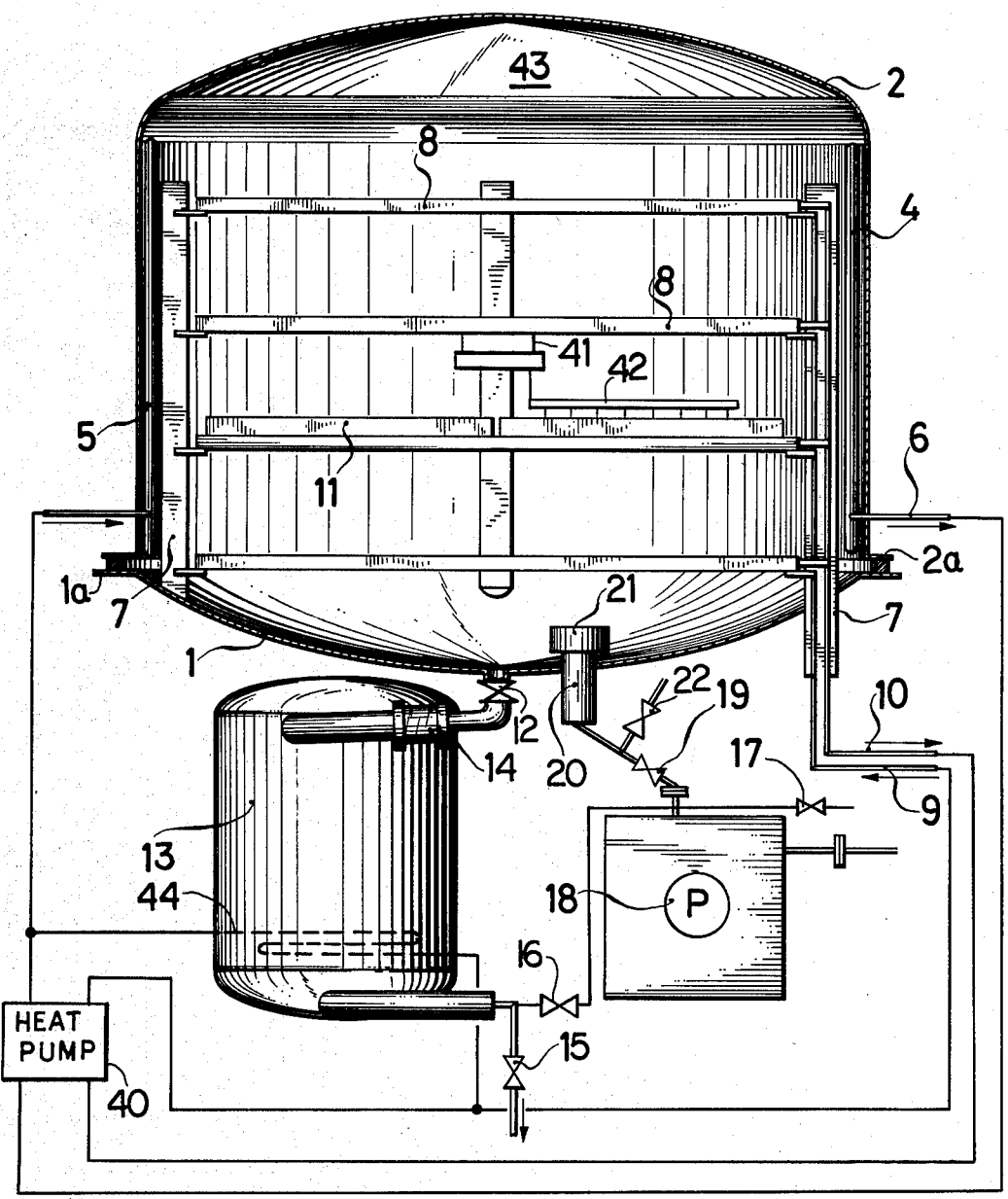

VACUUM-DRYING METHOD AND APPARATUS

FIELD OF THE INVENTION

Our present invention relates to a vacuum-drying method and apparatus and, more particularly, to a drying process which is particularly useful for the drying of organic objects, articles pieces or bodies (hereinafter referred to as products) and especially foodstuffs and biological materials which are sensitive to heat. The invention is especially intended to allow the drying of such products while retaining their quality, i.e. preventing degradation of cellular materials or other components of these products.

BACKGROUND OF THE INVENTION

The drying of products of the aforedescribed type plays an especially important role with comestibles, i.e. in the food industry, since an effective drying technique can eliminate the need for preservatives which might be detrimental to the health when ingested by certain individuals or when consumed in large quantities.

The earliest drying methods were, of course, relatively primitive, generally involving the exposure of the food product to conditions at which moisture tends to be lost from the product, e.g. by exposure to the sun, storage in ventilated or heated chambers, etc.

While such drying methods were found to be effective for many food products, they were incapable of effectively preserving others and hence modern technology recognizes a variety of more sophisticated drying techniques.

For example, freeze-drying and drying above the freezing point of the food product are both common for the preservation of foodstuffs of various types and in the production of "instant" products which can be restored to an edible form by the addition of water.

In freeze-drying, the product is introduced into a vacuum chamber and is subjected to subatmospheric pressures so that the drying results in a migration of the liquid substance from the food product by sublimation. In other drying techniques the moisture is lost primarily by evaporation.

In both of these systems the chamber is more or less continuously evacuated so that the released vapor or moisture is carried off with residual gases which may have been absorbed or retained in the product.

Such operations are not only uneconomical from an energy consumption point of view, but also may detrimentally affect the quality of the product. For example, in the freeze-drying of foods and like materials, the aromatic substances may be lost with the evacuated gases since such aromatics are relatively volatile. This is especially the case when upstream of the pump but downstream of the evacuated chamber, a low temperature zone is provided to enable the withdrawn substances to be collected.

In the dewatering or drying of biological materials, for example tissue samples, body fluids before or after separation into a multiplicity of components, pharmaceuticals, biological extracts and the like, a rapid drying can involve the danger that overheating may be destructive of cell walls or membranes and the protein content may be denatured; in general, there is the possibility that conventional techniques used in the drying of biological materials can cause a modification of the structure thereof or bring about other changes in the product which are undesirable.

It should be noted that such changes can also occur with freeze-drying, especially as to the cell structure.

OBJECTS OF THE INVENTION

It is the principal object of the present invention to provide an improved method of drying foodstuffs, biological materials and like organic products, whereby the quality of the dried material will be significantly greater than heretofore and disadvantages of earlier systems are avoided.

Still another object of the invention is to provide a method of drying such materials which is more economical than earlier systems from the point of view of energy consumption and at the same time yields a product of a quality not hitherto attainable.

Yet another object of the invention is to provide an improved apparatus for carrying out a drying method embodying the principles of the invention.

SUMMARY OF THE INVENTION

These objects and others which will become apparent hereinafter are attained in accordance with the present invention by subjecting the product, usually a solid in a spread-out form, to a vacuum in a sealed chamber which is connected with a suction pump to allow evacuation of gases and part of the moisture within the product. The product is disposed in close proximity to a condensing surface and, upon the appearance of significant condensate formation, the pump is disconnected from the chamber.

No later than the time at which the pump is disconnected from the chamber, the product is heated to an appropriate temperature $T_1$, sufficient to vaporize the moisture within the product at the vacuum prevailing in the chamber.

The condensate which is thus formed upon the condenser surface at a lower temperature $T_2$ is collected immediately below the product within the vessel in liquid form and the collected condensate is then removed from the container. Upon discharge of the collected liquid condensate from the vessel, the pump is reconnected to the vessel and after-evacuation is effected.

Surprisingly, this sequence and relationship of operative steps has been found to be able to dry especially sensitive materials such as comestibles or pharmaceuticals to a high degree without any detrimental modification of cell structure, degradation or denaturation of the protein, or like disadvantages. The process has been found to have general applicability to materials which have been both freeze-dried and dried at temperatures above the freezing point heretofore and yields a product of improved quality, more rapidly and with less power consumption than heretofore. Furthermore, contact of the liquid which is removed from the product with the pump oil is largely eliminated so that the loading of the pump is reduced.

In earlier vacuum drying systems it was recognized that the drying speed was proportional to the depth of the vacuum which could be generated in the chamber and hence it was assumed that the most effective drying technique required the vacuum pump to operate during the entire drying process and to extract the liquid, in the form of vapor, from the vacuum vessel for condensation outside the latter. Presumably it was assumed that any liquid not in vapor form and even vapors of the removed liquid could reduce the degree of drying and the efficiency if they remained in the vessel.

We have now discovered, quite surprisingly, that both of these concepts were erroneous in that, in spite of the fact that the condensation surface or condenser is present in the evacuated vessel directly adjacent the product to be dried, there is little or no reduction in the drying efficiency and in fact the efficiency and speed are improved.

Only at the inception of the drying process described is it necessary to have the pump continuously connected and operated and this until the pressure has been reduced to a level which can be equal to or greater than 0.1 mbar (i.e. $\geq 0.1$ mbar) and which is measured by the point at which noticeable condensation is observed on the condenser surface. At this point further reduction of the pressure is unnecessary at least until the after-evacuation mentioned above.

The pump is disconnected from the evacuated vessel and further release of moisture from the product is effected under the retained vacuum in the vessel and the heating of the product to a temperature well below that to which the product may be sensitive as mentioned earlier.

The initial evacuation, which can be effected over a period of about 10 to 20 minutes, serves to remove noncondensible and trapped gases with entrainment of some water vapor which condenses upon the cooled surface and serves as a signal for disconnecting the vessel from the pump.

The partial pressure of the noncondensible gases remains at the initial low level established in the high-vacuum hermetically sealed vessel at the cutoff of the pump and only rises as a result of evolution of the gases from the products to be dried. These gases are removed during the after-evacuation step upon removal of the condensate.

The product to be dried is preferably heated to a maximum of 60° C. and advantageously to a temperature level of at most 50° to 60° C. upon attainment of the final evacuation pressure during the first stage and the cutoff of the pump. This temperature is ascertained by measuring the temperature of the product and controlling the feed of the heating agent (fluid) into indirect heat exchange with the product. In general, the temperature to which the product is heated should be as low as possible consistent with the evolution of condensible moisture and, with especially sensitive materials, the product temperature can be held to at most about 30° C.

Naturally, the condenser temperature ($T_2$) will be below the temperature to which the product is heated and generally will be above 0° C. However, temperatures below 0° C. can also be used on occasion if desired.

The condenser temperature can be established by passing cooling water through the condenser and we have found that best results are attained when the cooling water has a temperature between 12° and 18° C. Higher temperatures result in reduced mass transfer. Generally, the temperature differential between the temperature $T_1$ of the product to be dried and that of the condenser surface should be maintained between about 30° and 35° C.

The mass transport of the moisture to be removed as condensate can be increased by providing the condenser with an increased surface area and in general the effective surface of the condenser should be as large as possible consistent with the need to provide space for the product within the vessel. Furthermore, the closer the condenser surface is to the product to be dried, the greater the condenser efficiency. However, in designing the vessel care should be taken to arrange the condenser surface so that the condensate flowing therefrom will accumulate only in the condensate chamber directly below the drying chamber and will not contact the product to be dried.

According to the invention, below the condensate collecting chamber in the hermetically sealed, vacuum-retentive vessel, there is provided a condensate receptacle which is connected to the condensate chamber and can be cut off from the latter by a valve or the like. This condensate receptacle can be arranged so as to be capable of emptying while the vacuum-type chamber is operative. This receptacle need not be separately cooled and can be discharged at room temperature. The condenser surface can be concentric with the product and any support therefor.

The condenser temperature is generally below room temperature or ambient temperature and to prevent back flow of condensate from the condensate receptacle to this vessel, it has been found to be advantageous to cool the condensate receptacle, e.g. with a cooling coil or cooling jacket. The condensate-collecting space below the product may be likewise cooled by a jacket or cooling coil.

According to another feature of the invention, the product to be dried is intermittently or continuously agitated, stirred or turned to substantially reduce the drying time still further.

In the drying of especially sensitive products, such as herbs, and other plant matter, which only contain small amounts of moisture, little water evaporates during the initial evacuation period. The displacement of air from the drying chamber by the evolved water vapors is limited and some times it is difficult to observe the condensate formation described above. In this case, we may add a small quantity of water to the chamber prior to evacuation, e.g. in the condensate chamber. During the evacuation, this water is vaporized to drive out the air and condensate formation can be readily observed.

In practically every case, after-evacuation serves to remove additional moisture and hence decreases the moisture content of the ultimate product.

The products of the present invention have substantially unaltered cell structures with protein which is not denatured or otherwise modified and has the dry texture and character desired while retaining the original aroma and essential oils.

The drying technique of the present invention has been found to be especially effective for substances which are predominantly proteins or in which the protein component plays an especially important role, since proteins are normally known to coagulate at temperatures between 50° and 60° C. and undergo irreversible change.

The invention is also important when the products are or contain sugars since a large number of sugars also undergo irreversible change at elevated temperatures. For example onions should not be heated above 50° C. under normal conditions to avoid transformation of the sugar content thereof. The system of the invention also retains the effectiveness of vitamins present in the products and is significant in this respect because many earlier drying systems have caused irreversible destruction of vitamins.

The drying process of the present invention, by direct passage of the moisture into the vapor phase and its removal as condensate at relatively low temperatures, to the exclusion of other gases, is especially rapid and yields a product with significantly reduced moisture content.

By comparison with earlier drying methods, the liquid is rapidly evaporated at the surface of the products while the pressure in the gas chamber is held relatively small. The surface drying is effected rapidly and this restricts transfer of moisture from the interior of the product in liquid form to the surface. The liquid transport through the material results in aroma loss as well as changes in the nature of the product. In the system of the present invention, an initial dry layer does not form to impede further transport of the product and hence the drying operation is more homogeneous and uniform.

The process of the present invention allows drying at relatively high pressure, preferably between 5 and 30 mbar, although the dryer must be vacuum-tight and must be capable of sustaining pressures as low as $10^{-4}$ to $10^{-5}$ mbar. We have found that this is important because the vacuum must be sustained for relatively long periods after the pump has been cut off without a pressure increase by communication with the surroundings.

The drying time may be of the order of hours and the partial pressure of the uncondensible gases, usually air, should remain as low as possible, i.e. should only increase to the extent that air or other noncondensible gases are contributed by the products.

Thus it is important to the present invention to keep the leak rate of the vessel as low as possible in spite of the fact that the pressure in the drying chamber is relatively high. With increasing partial pressure of noncondensible gases, the mass transport of the water vapor to the condenser surfaces drops markedly and the drying speed is decreased.

According to another feature of the invention, the evacuation at the start of the drying process can make use of a relatively inexpensive vacuum pump system rather than the costly high vacuum systems heretofore. In fact, any vacuum pump capable of generating a final pressure of the order of $10^{-1}$ mbar can be utilized since the evacuation initially results in the expulsion of air by moisture from the product. The partial pressure of residual air in the dryer is thus not determined by the final pressure of the vacuum pump but rather by the duration of evacuation, i.e. the time span over which the air is expelled by the moisture.

With customary dimensions of the dryer and the vacuum pump, the initial evacuation phase can take 5 to 10 minutes depending upon the product to be dried. Insufficient evacuation can be recognized by a lack of significant condensate flow.

In the system of the present invention, moreover, a condenser between the drying chamber and the vacuum pump is superfluous. However, when the evolved gases are toxic or corrosive (aggressive), it is advantageous to remove them, by condensation upstream of the pump. Alternatively, toxic or aggressive gases can be downstream of the pump outlet.

The evacuation is preferably carried out with a liquid-ring vacuum pump with a gas jet, instead of an oil pump, since oil-type vacuum pumps generally require high oil changes because of the liquid throughput.

Finally, with respect to the advantages of the present system, mention may be made of the fact that the mass flow between the product to be dried and the condenser is very high with the system of the invention. The economics of the system are also favorable over systems which raise the product to elevated temperatures or which continuously operate a vacuum pump.

It utilizes only a small amount of heat so that both cooling and heating systems with the present invention can be dimensioned minimally and utilize little energy.

The system has been found to be especially effective when a heat pump is employed, the warm side being used to provide the energy necessary to heat the product while the cold side serves to cool the condenser.

The pump energy is only utilized for a small portion of the drying process and then only to generate vacuums of about 10 mbar, whereupon the pump can be cut off.

According to the invention, the product to be dried is spread, e.g. on trays, to layer thicknesses of up to 8 cm. By contrast with earlier systems which could effectively use layer thicknesses up to only about 4 cm, the amount of material which can be dried in a given apparatus can be significantly increased.

Even with product temperatures lying only slightly above the condenser temperature the drying rate can be relatively high. With foodstuffs, for example, the product temperature can be about 50° C. while the condenser temperature is 10° to 15° C. for most effective results.

The product to be dried is preferably heated during the process by bottom heating, i.e. by contact with a heated surface such as the tray bottom. The residual moisture in the dried material can be 1% by weight or less.

Because the temperature of the product is relatively low and easily adjusted, the process is extremely versatile and can be used to dry practically any temperature-sensitive comestible or pharmaceutical product.

When the moisture to be removed is a solvent, for example an acid or other aggressive substance, the invention is especially effective because there is minimum contact of the pump with the aggressive medium.

Still another feature of the invention is that the drying chamber does not require any partition or other pressure-retaining separator between the condensate-collecting space and the drying space. This greatly simplifies the apparatus and keeps its cost at a minimum.

BRIEF DESCRIPTION OF THE DRAWING

The above and other objects, features and advantages of the present invention will become more readily apparent from the following description, reference being made to the accompanying drawing in which the sole FIGURE is a diagrammatic cross-sectional view illustrating an apparatus for carrying out the invention.

SPECIFIC DESCRIPTION

The apparatus of the invention comprises a fixed, upwardly concave bottom 1 having a flange 1a upon which a seal 3 can be provided for engagement by the flange 2a of a downwardly open hood 2. The hood 2, which can be raised and lowered by means not shown, forms with the bottom 1 a vacuum-tight drying vessel capable of sustaining vacuums of $10^{-4}$ to $10^{-5}$ mbar.

A condenser 4 is mounted along the inner wall of the hood 2 and is provided with an inlet 5 for the liquid coolant and with an outlet 6 for this coolant.

Advantageously, the coolant is circulated by the cold side of a conventional heat pump represented generally at 40.

The condensate collects on the bottom 1 and runs to the center thereof.

Within the hood 2 a plurality of posts 7 are fixed to and rise from the bottom 1 and carry heating plates 8 through which a heating medium can be circulated from an inlet 9 to an outlet 10.

The inlet and outlet 9 and 10 are connected to the warm side of the heat pump 40 as shown.

The heating plates 8 can carry drive motors 41 for rakes 42 or other agitators or turners for the product to be dried which is placed upon the plates 8 in trays 11.

The condensate which collects upon the surfaces of the condenser 4 and accumulates in the bottom 1, can be withdrawn through a high vacuum valve 12 for recovery in the condensate receptacle 13 outside the vacuum-tight chamber 43. The condensate train line is provided with a viewing glass or window 14 so that the condensate flow can be visually ascertained by an operator.

A cooling coil 44 in the receptacle 13 can serve to maintain the temperature of the collected condensate below that on the bottom 1.

A high vacuum valve 15 can be used to discharge the condensate receptacle 13 and allow evacuation of the chamber 43 through the receptacle 13 and a high vacuum valve 16 by the pump 18. The valve 15 serves to allow venting of the vacuum pump 18 which is connected by a high vacuum valve 19 and a fitting 20 whose cap 21 permits the chamber 43 to be evacuated. Valve 22 permits venting of the drying chamber following the vacuum operation.

The arrangement of the product carrier and condenser can, of course, be modified from the construction shown, e.g. by enabling the two to interfit in spiral or helical ramps and surfaces.

With the hood raised, the receptacle 13 can be drained with valves 16, 17, 19 and 22 closed and valves 14 and 12 open, the product to be dried being placed upon the heating surfaces 8.

The hood is then lowered in place and the pump 18 started after valve 15 is closed, thereby evacuating chamber 43. The condenser 4 is cooled to its appropriate temperature $T_2$ which is lower than $T_1$, the temperature to which the product is heated by the plates 8. When significant condensate runoff is observed through the viewing glass 14, the valve 16 is closed and the pump 18 is turned off. The vacuum is thus maintained in chamber 43 for the main drying operation, condensate being collected during this period. When condensate collection ceases, valve 12 is closed and valve 19 is opened to after-evacuate the chamber 43. The completion of the drying is followed by opening valves 17 and 22 to vent the chamber 43, whereupon the dry product can be removed.

SPECIFIC EXAMPLES

Example I—Potato drying 25 kg of potatoes, cut into pieces, with a moisture content of 85% by weight, is placed in the drying chamber shown in FIG. 1 in layer thickness of 2 cm on the trays. The apparent surface of the dried product was 1.6 m$^2$.

The chamber was evacuated over 10 minutes to a pressure of about 14 mbar and the condenser was fed with cooling water at a temperature of 14° C.

After evacuation the chamber 43 is cut off from the pump and the pump is turned off. The heating plates are heated to raise the temperature of the product to 24° C. and after 3 hours the pressure is found to be 20 mbar as a result of gas evolution from the product. The chamber 43 is evacuated again and the pump disconnected from the chamber. After 6 hours drying is complete and the maximum temperature of the product at the end of this period is 46° C., the residual moisture is 10.2% by weight and the drying rate was found to be 2 kg/h/m$^2$.

EXAMPLE 2—DRYING OF ONIONS 36 kg of onion rings with a moisture content of 82% by weight are dried in the trays with a layer height of 4 cm. The exposed surface of the product was 3.2 m$^2$. The chamber was evacuated for 10 minutes to a pressure of 14 mbar. The cooling water temperature was 13° C. and after evacuation the pump was shut off and disconnected from the chamber. The heating plates brought the product to a temperature of 30° C. and after 4.5 hours the pressure rose to about 18 mbar. The chamber was vented and the product turned by hand. The chamber was evacuated again and after 9 hours the drying of the onion rings was considered terminated. The maximum product temperature was 35° C., the residual moisture 8% by weight and the drying rate 1 kg/h/m$^2$.

EXAMPLE 3—DRYING OF POWDER 64 kg of binder-coated particles of carbon with a moisture content of 50% by weight were piled in the trays to a layer height of about 4 cm. The exposed surface of the product was 3.2 m$^2$. The chamber was evacuated for 10 minutes to a pressure of about 10 mbar. After 13 hours drying was considered ended and the maximum temperature to the end of drying amounted to about 48° C. The residual moisture was 1% by weight and the drying rate 0.8 kg/h/m/$^2$.

In all three cases, the pump was turned off when significant condensate flow was observed and in all three cases the moisture content could be reduced still further by disconnecting the condensate receptacle and after evacuation.

We claim:
1. A method of drying a product which comprises the steps of:
   (a) disposing said product in a subdivided form in a high-vacuum-tight chamber;
   (b) cooling a condenser surface in said chamber to a temperature $T_2$ above 0° C. but below a drying temperature $T_1$ of said product;
   (c) evacuating said chamber to a subatmospheric pressure of substantially 5 mbar to substantially 35 mbar until noticeable condensation is observed on the condenser surface and then terminating evacuation of said chamber, the product being heated to the drying temperature $T_1$ at least after termination of evacuation;
   (d) maintaining said chamber sealed upon termination of evacuation and while further evacuation is halted whereby moisture from said product continues condensing upon said surface, the condensate collecting at the lower part of the chamber being repeatedly drained out into a condensate receptacle and
   (e) evacuating the chamber again when condensation subsides indicating an increase in pressure of non-condensible gases.

2. The method defined in claim 1 wherein said condenser surface is cooled to a temperature of substantially 12° to 18° C. and said product rising in temperature in step (d) to a maximum of about 50° C.

3. The method defined in claim 1 wherein water is introduced into the space containing said product in said chamber prior to step (b).

4. The method defined in claim 1 wherein said product is disposed in said chamber in step (a) in a layer of a thickness up to about 8 cm.

5. The method defined in claim 1, further comprising agitating said product in said chamber.

6. The method defined in claim 1, further comprising turning said product in said chamber.

* * * * *